United States Patent [19]
Muller

[11] 3,890,845
[45] June 24, 1975

[54] APPARATUS FOR DETERMINING IMBALANCE IN 120 DEGREE SPACED COMPONENTS AND METHOD OF CORRECTING SAID IMBALANCE

[75] Inventor: Richard Muller, Worfelden, Germany

[73] Assignee: Gebr. Hofmann KG, Darmstadt, Germany

[22] Filed: June 26, 1974

[21] Appl. No.: 483,442

[30] Foreign Application Priority Data
Aug. 23, 1973  Germany............................ 2342665

[52] U.S. Cl..................................... 73/462; 73/468
[51] Int. Cl....................... G01m 1/22; G01m 1/34
[58] Field of Search........ 73/66, 462, 464, 465, 468

[56] References Cited
UNITED STATES PATENTS
3,248,951  5/1966  Trimble ............................... 73/462
3,811,327  5/1974  Hack.................................... 73/465

Primary Examiner—James J. Gill
Attorney, Agent, or Firm—Cushman, Darby & Cushman

[57] ABSTRACT

A method and circuit for determining the amounts of initial imbalance of a workpiece in two components displaced by 120° with respect to each other and determining the residual amounts which remain, after initial removal of material, in further components displaced by 60° with respect to both said components whereby when the amount of material to be removed in one of the two initial components exceeds the maximum indicated by a reference signal, the maximum is removed and the amount removed in the other 120° component is equal to the difference between the reference signal and signal in the exceeded component subtracted from the other component signal so that remaining imbalance may be removed in a third component displaced 60° with respect to both of the initial components.

6 Claims, 5 Drawing Figures

Fig. 1
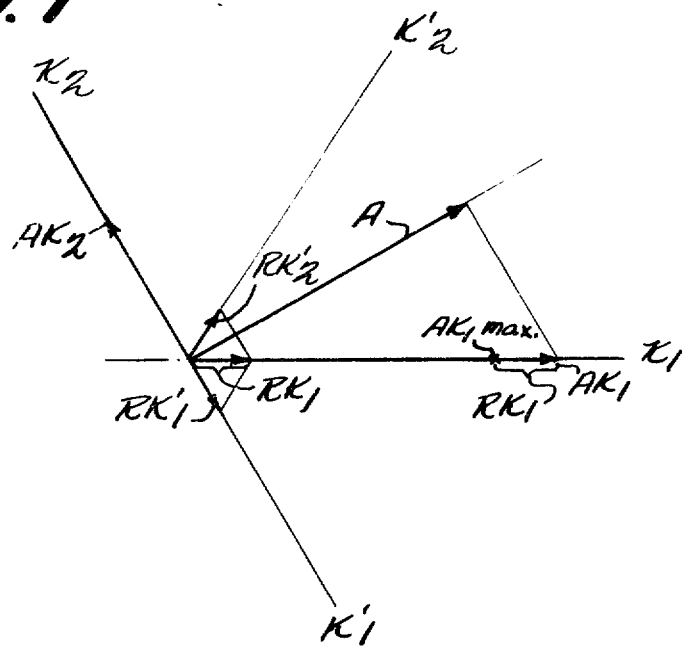
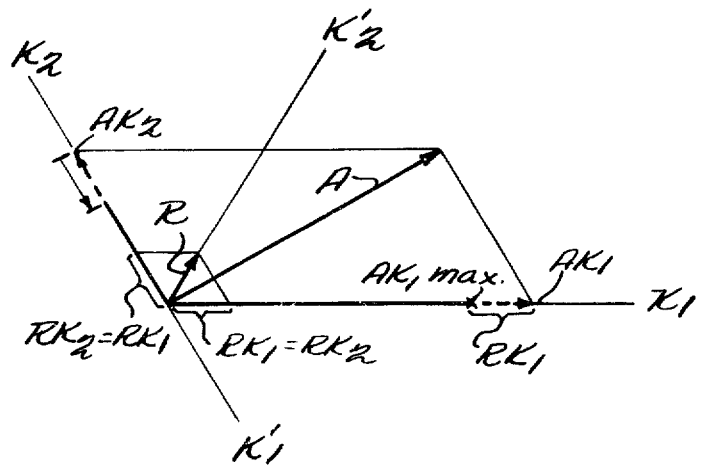
Fig. 2

APPARATUS FOR DETERMINING IMBALANCE IN 120 DEGREE SPACED COMPONENTS AND METHOD OF CORRECTING SAID IMBALANCE

The invention relates to a method of eliminating imbalances in rotor in which a compensation of masses by removing material is carried out in components displaced by 120°, and in which, if only limited material is available for removal, material is subsequently removed in further components displaced by 60° with respect to the former components, and to an electric circuit for the determination of the amounts of an initial imbalance in two components displaced by 120° with respect to each other, and for the determination of residual amounts of the initial imbalance remaining in further components displaced by 60° with respect to the former components, by means of a component calculator provided with at least two component outputs for two components displaced by 120°, to which an imdicating system for the position of the angle sector of the imbalance is connected.

It is a known practice in the field of balancing to split a vector of imbalance determined during the rotation of the rotor to be balanced, in such a way that the imbalance can be eliminated in three points displaced by 120° with respect to each other, e.g. by removing material by drilling. Known devices can be designed in such a way that the vector of imbalance, converted into components, is, in the form of two measured values, directly fed to two drilling or milling machines displaced by 120° with respect to each other. The rotor after the measuring run is then stopped in a position suitable for machining so that the drilling or milling machines drill in the points provided for machining whereby the test data represents a measure for the drilling depth in the individual components.

It often happens that motors to be balanced have a shape which would allow a compensation of masses in six components displaced by 60°, but that it is not possible to arrange two drilling units closely side by side because of their large size. Therefore, a compensation in 120° components is now effected even in the case of such rotors. Between the components provided for the first compensation of masses, three further components displaced by 120° with respect to each other are then available for a possible subsequent compensation.

The latter procedure is of special importance if the material available is not sufficient for eliminating the determined maximum initial imbalance during the first measuring run or the first balancing procedure respectively. In such cases it is recognized already during the measuring run that the material available does not suffice for eliminating the initial imbalance after the first test run. During a subsequent test run it is found out that it had not been possible to reduce the initial imbalance to the desired tolerance. Then a second measuring run is effected, during which the remaining residual imbalance is measured and divided between 120° components displaced by 60° with respect to the former components, and the machining is carried out in the points not yet machined of these components. In detail this known procedure is carried out in such a way that due to the only limited material available for the compensation machining, the amount of initial imbalance measured in one component can only be eliminated except for a residual amount which is determined by the maximum amount to be eliminated in this component. Therefore, a residual imbalance remains in this component after the compensation of masses. During a second measuring run this residual imbalance is measured and divided between the components still available for machining. During a second machining procedure the imbalances in these two components are eliminated.

In the course of this known procedure drilling is effected in four different components in the rotor to be balanced. For accurately carrying out these four drillings and the removal of material respectively, the device serving for the compensation of masses must function very precisely. The known procedure is complicated and the device for the compensation of masses becomes rather costly.

It is the object of the invention to describe a method of eliminating imbalances in rotors displaced by 120°, whereby removal of material for the compensation of masses must be effected in at most three components.

This object is achieved with the method of this invention in that, if the initial imbalance in one component is so large that there is not sufficient material for removal, the maximum possible amount of material is removed leaving a remainder in this component, and in that material is removed in the adjoining component displaced by 120° until the same residual imbalance has been produced, and in that the imbalance resulting from the two residual values is subsequently eliminated by removing material in a component displaced by 60°.

Further, the abovementioned object is achieved with this method, if the initial imbalance in one component is so large that the material available for removal does not suffice for the balancing of the masses, the maximum amount of material to be removed is drilled off in this component, and in that, if the determined amount of initial imbalance in the adjacent component displaced by 120° is smaller than the remainder left in the first component, an amount of material corresponding to this differential amount is removed in a component displaced by 180° with respect to the adjoining component, and furthermore a removal of material corresponding to the remainder left in the former component is effected in a component arranged between the former and the adjoining component on the angle bisector, so that the imbalance left after the first removal of material is eliminated.

For determining the amounts of initial imbalance in two components displaced by 120° with respect to each other, and for determining residual amounts of initial imbalance in further components displaced by 60° with respect to the former components, an electric circuit is provided comprising a component calculator with outputs for two components displaced by 120°, an indicator for the angular sector location of the imbalance being connected to the component calculator. The component outputs of the calculator are each connected to one comparator circuit and a reference voltage source is provided, which is in turn connected to each comparator circuit, whereby, if the voltage existing at the one component output exceeds the reference voltage, an electric differential voltage corresponding to the voltage difference appears at the output of the one comparator circuit. A subtraction circuit is provided which subtracts this differential voltage from the voltage at the other component output.

The advantages achieved with the invention reside in the fact that with a maximum of only three material-removing procedures in three components compensation for imbalance can be effected. Further, only one measuring run is required for carrying out the whole compensation for imbalance in the corresponding components.

Furthermore the compensating device for eliminating imbalance can be of a simpler design. Unnecessary drillings on the rotor to be balanced are avoided. The invention will now be explained in detail on the basis of the attached figures in which:

FIG. 1 shows a schematic view of a conventional balancing procedure.

FIGS. 2 and 3 show schematic views of the procedures according to the invention.

Figure 3:
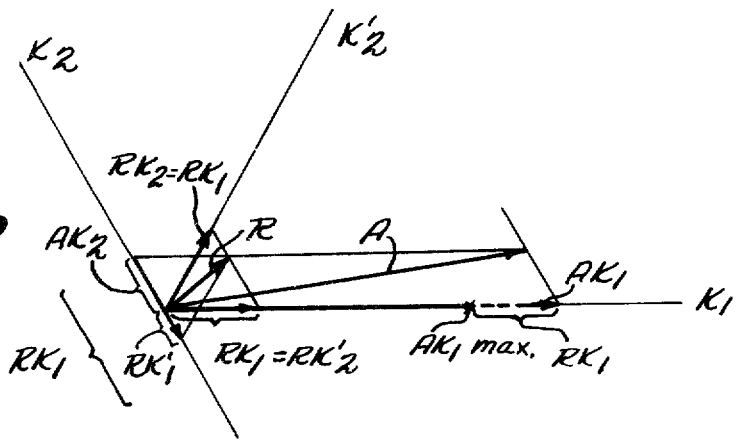

Reference is now made to FIG. 1 which shows a schematic view of a method according to the prior art. Here an initial imbalance, which is split in the components K1 and K2 for machining, is shown as vector A. The amount of the initial imbalance in K1 is designated at $AK_1$ and the amount of the initial imbalance in K2 is designated as $AK_2$. If only limited material is available for compensation machining in the component K1 and the amount of maximum material removable in the component K1 corresponds to the value $AK_1$ max shown in the figure and is smaller than the amount of the initial imbalance in the component K1, then a residual imbalance RK1 remains in the component K1 when this maximum removable material is removed.

After the corresponding amount of the initial unbalance A, manely $AK_2$, has also been removed in the component K2, a residual imbalance RK1 in the component K1 remains in the rotor to be balanced. This residual imbalance RK1 is split into the amounts Rk'1 and RK'2 in the components K'1 and K'2 which are displaced by 120° with respect to each other and by 60° with respect to the components K1 and K2. After the removal of the residual amounts RK'1 and RK'2 the initial imbalance A is definitely eliminated.

FIG. 1 reveals that four drillings have been effected during the compensation for imbalance, namely in the components K1, K2 and K'1, K'2. Besides, it may be seen from FIG. 1 that the two components K'1 and K'2 lie opposite each other so that the machining in one of these components could have been dispensed with after all. With both methods too much material is removed from the rotor to be balanced. With the present invention this is avoided. Methods according to the invention are schematically represented in FIGS. 2 and 3 which shall now be described in detail.

With the method according to FIG. 2 the vector of the initial imbalance A is split into an amount $AK_1$ and an amount $AK_2$ in the two components K1 and K2 displaced by 120° with respect to each other. If the amount of the initial imbalance A in one of the components K1 and K2 exceeds the maximum amount of material available for the compensation for imbalance in one of these componenets, a residual initial imbalance remains in one of the components K1 and K2. In FIG. 2 this has been presumed for the case that the amount $AK_1$ exceeds the maximum amount of material to be removed, $AK_1$ maximum, so that a residual amount A in the component K1, namely RK1 remains in the component K1 after the maximum amount of material to be removed in the component K1 has been removed. If the residual amount RK1 of the initial imbalance in the component K1 is smaller than the amount $AK_2$ of the initial imbalance A in the component K2, the imbalance in the component K2 is also eliminated, save a residual imbalance RK2 which equals the residual imbalance RK1 in the component K1. These two residual amounts of imbalance RK1 and RK2 form a resultant imbalance R located in the component K'2 which is displaced by 60° with respect to the components K1 and K2. After the elimination of this resultant imbalance R in the component K'2 the whole imbalance A in the rotor has been eliminated in three material-removing procedures.

It results from the above and from FIG. 2 that only in K1, K2 and K'2 a removal of material has taken place so that in the component K'1 such a removal could be avoided. A second measuring check run for determining the residual imbalance R is not required as this residual imbalance R automatically results from the equally large residual imbalances RK 1 and RK2 present in the components K1, K2.

With the method according to the invention shown in FIG. 3, the amount of the initial imbalance A in the component K1 also exceeds the amount of material AK1 maximum which is maximally available for the compensation for imbalance in this component K1. The difference between the amount of initial imbalance AK1 in the component K1 and the amount of material AK1 maximum which is available for the compensation for imbalance in the component A, is the residual amount of imbalance RK1 in the component K1.

This residual amount of imbalance RK1 in the component K1 exceeds the amount $AK_2$ of the initial imbalance A in the adjacent component K2. From FIG. 3 results that with the amount of material AK1 maximum which is available in the component K1, a residual amount of imbalance RK1 is left. Furthermore a residual amount RK'1 of an imbalance acting in the component K'1, results as difference between the residual amount RK1 of the imbalance in the component K1 and the amount $AK_2$ of the initial imbalance A in the component K2, whereby the component K'1 is displaced by 180° with respect to the component K2.

From this results the residual imbalance R after the first compensation procedure. This resultant imbalance may be split into two components lying in K'1 and K'2, whereby K'2 is a component coinciding with the angle bisector of the two components K1 and K2, i.e. K'2 is displaced by 60° with respect to K1 and K2. In component K'2 the resultant imbalance R is designated as RK'2 and in the component R'1 as RK'1. By removing corresponding amounts of material in these components K'2 and K'1, the resultant imbalance can be definitely eliminated. It must be noted that the amount RK'2 in component K'2 equals RK1 in component K1 so that the resultant residual imbalance R can be definitely eliminated.

From FIG. 3 results that already after the first compensation of masses a resultant residual imbalance R is obtained by removing the maximally available material; the residual imbalance can be smaller than that obtained with the customary method, whereby with the known method material has already been removed in two components. With the known method a residual imbalance remains in the component K1 after material has been removed two times, as may be seen from FIG. 1, whereas with the method according to the invention shown in FIG. 2, a residual imbalance R is left over after the first compensation of masses.

Thus it may happen with the method according to FIG. 3 that already after the first compensation of masses, i.e. after the removal of the whole amount of material available in the component K1 the remaining residual imbalance is already so small that it lies within the tolerance limits.

Especially when the compensation of imbalance has been carried out in the component K′2 as well, i.e. after the amount RK′2 corresponding to the amount of residual imbalance in the component K1 has been eliminated in the component K′2, the resultant imbalance is so small that it oftem lies with the tolerance limits.

As already mentioned above, it is advantageous that RK2 equals RK1 inasmuch as the differential amount can be used already for the removal of material in the second working operation so that only a single measuring run is required. Thus the second compensation of masses can be carried out immediately after the first one, without an additional test measuring run being required, even if only a limited amount of material is available for the compensation for imbalance in one component.

Figure 4:
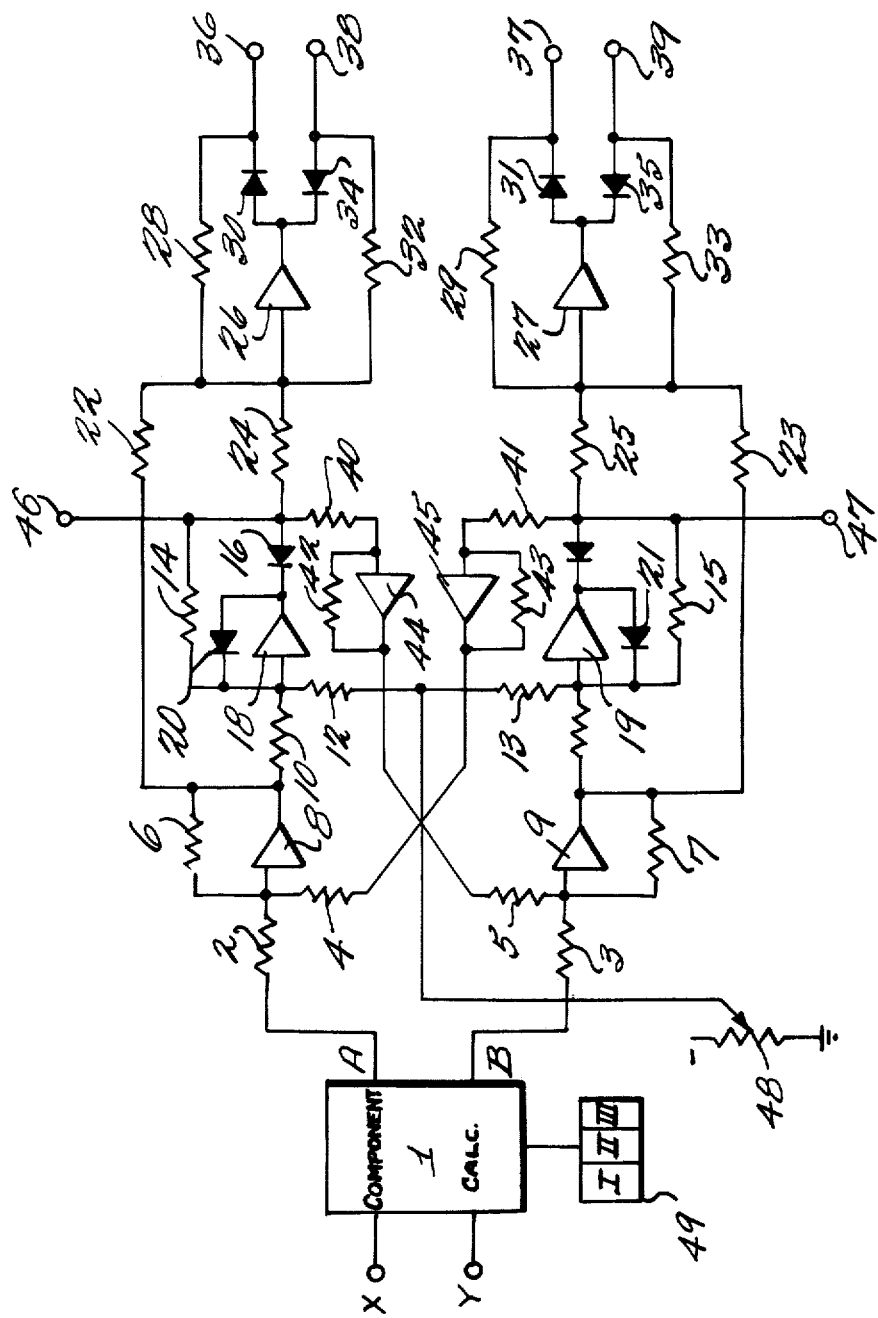
FIG. 4 shows an electric circuit diagram according to the invention.

FIG. 4 shows an electric circuit by means of which the individual subtractions or the formation of difference described in the above procedure can be carried out. The electric circuit shown in FIG. 4 includes a conventional component calculator 1 into which the components $x$ and $y$ of an imbalance from a conventional balancing apparatus are fed in the form of direct voltages and in which they are converted into two components displaced by 120° with respect to each other. These displaced components also appear in the form of direct voltages at the output terminals A and B and are available for further use. An conventional indicating display unit 49 for displaying the angle sector position of the imbalance is also connected to component calculator 1.

Figure 5:
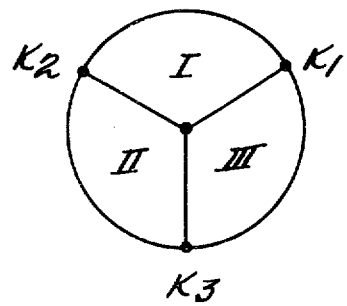
FIG. 5 shows a diagram explaining the electric circuit diagram and the methods according to the invention.

FIG. 5 explains operation of the indicating unit 49, and shows three components K1, K2 and K3 displaced by 120° with respect to each other. The sectors lying between the components are designated I, II and III. According to its position, the initial imbalance vector appears in one of the indicated angle sectors I, II, III. Instead of the indicating unit 49 a conventional automatic indexing device for the rotor can be used to place the rotor beneath two working tools in such a way that the voltage value appearing at the output terminal A is always handled by one working tool and that the voltage value appearing at the output terminal B is always handled by another working tool.

FIG. 4 shows in detail a circuit provided for the special cases according to FIGS. 2 and 3, by means of which the individual values of imbalance to be eliminated in the components during the compensation of unbalance, can be determined. In this circuit all resistances preferably have the same resistance value, and all operation amplifiers represented are designed as inverting amplifiers. At the output terminals A and B of the component calculator 1 negative values are available. Consequently the output voltage at the output terminal A and at the output terminal B respectively is available as positive voltage at the outputs of the amplifiers 8 and 9 respectively due to the loading of resistances 2 and 6 or 3 and 7 respectively. The individual voltage is fed from the amplifier 8 or 9 respectively to an amplifier 18 or 19 respectively through a resistance 10 or 11 respectively. To this voltage a preset negative voltage is added through a resistance 12 or 13 respectively, which is adjusted at a potentiometer and acts as reference voltage. This adjusted negative voltage corresponds to the maximum amount of material available for the compensation for imbalance in one component.

If the positive voltage at the output of the amplifier 8 or 9 respectively is smaller than the negative voltage tapped off from the slider of the potentiometer 48, a positive voltage will arise at the output of the amplifier 18 or 19 respectively. This positive voltage is blocked by a diode 20 or 21 respectively so that no voltage is fed through diode 16 or 17 respectively blocked for this polarity, to the terminal 46 or 47 respectively which is additionally provided as an output terminal.

Only when the output voltage of the amplifier 8 or 9 respectively becomes greater than the negative voltage at the slider of the potentiometer 48, will a negative voltage arise at the output of the amplifier 18 or 19 respectively, which reaches the output terminal 46 or 47 respectively through the diode 16 or 17 respectively. Therefore, a negative voltage will arise at the output terminal 46 or 47 respectively only when the output voltage at the output terminal A or B respectively of the component calculator potentiometer exceeds the negative voltage adjusted at the slider of potentiomter 48. The output voltage of the amplifier 8 or 9 respectively is in addition fed to the input of an amplifier 26 or 27 respectively through the resistance 22 or 23 respectively so that it is guaranteed that at the output of the amplifier 26 or 27 respectively always a negative voltage arises, with the result that the diode 34 or 35 respectively connected at the output of the amplifier 26 or 27 respectively becomes conductive and an inverse feedback of the amplifier 26 or 27 respectively through the resistance 32 or 33 is effected. At the output terminal 38 or 39 respectively in the circuit of FIG. 4 an output voltage will at first arise, the size and polarity of which correspond to those of the voltage present at the output terminal A or B respectively of the component calculator 1. Only when the voltage at the terminal A or B respectively exceeds the voltage adjusted at the slider of the potentiometer 48, will the negative voltages now arising at the terminal 46 or 47 respectively be subtracted through the resistance 24 or 25 respectively from the voltage fed through the resistance 22 or 23 respectively, so that the voltage at the terminal 38 or 39 respectively will not increase even if the voltage at the terminal A or B respectively increases further.

At the same time negative voltage arising at the terminal 46 or 47 respectively is inverted through an amplifier 44 or 45 respectively and subtracted as positive voltage from the negative voltage at the output terminal B or A respectively through the resistance 5 or 4 respectively. At the output of the amplifier 9 or 8 respectively there is consequently the inverted part of the voltage present at the output terminal B or A respectively, from which, however, the difference between the voltage at the terminal A or B respectively and the voltage adjusted at the potentiometer 48 is subtracted. The output voltage of the amplifier 9 or 8 respectively reaches the input of the amplifier 27 through the resistance 23 or 22 respectively and is fed as negative voltage to the output terminal 39 or 38 respectively through the diode 35 or 34 respectively. The voltage at the terminal 39 or 38 respectively, when exceeding the voltage at the output terminal B or A respectively with respect to the voltage adjusted at potentiometer 48.

In the case of extremely small aperture angles, as shown in FIG. 3, it happens that the voltage at the terminal 46 or 47 respectively exceeds the voltage at the terminal B or A respectively so that a negative voltage arises at the output of the amplifier 9 or 8 respectively. This negative voltage now causes the diode 31 or 30 respectively arranged parallel to the diode 35 or 34 respectively at the output of the amplifier 27 or 26 respectively, to become conductive and the parallel diode 35 or 34 respectively to become non-conductive thus bringing the voltage at the output terminal 39 or 38 respectively to zero. At the terminal 37 or 36 respectively there is a positive voltage the amount of which does according to FIG. 3 represent a measure for subsequent treatment.

In FIG. 4 the amplifiers 8, 18, 26 and 44 and the amplifiers 9, 19, 27 and 45 are identical, so that when either the output voltage at the output terminal A or that at the output terminal B exceeds the voltage adjusted at the potentiometer 48, a voltage arises either at the output terminal 46 or 47 which causes the voltage at the output terminal 38 or 39 to be reduced.

Voltage arising at the terminal 46 or 47 respectively represents according to FIG. 2 or 3 a measure for the subsequent treatment in the additional component K'2, between the two measured components K1 and K2. The terminals 38 and 39 each supply a d.c. voltage the amount of which corresponds to that of the material to be removed by the two machining tools. The voltage at the terminal 46 or 47 respectively corresponds to the amount of material which must be subsequently removed between the two measured components. If an imbalance is present at the terminal 36 or 37 respectively, the voltage at the terminal 38 or 39 is zero so that only one of the two machining tools operates during the first working procedure. A voltage possibly existing at the terminal 36 or 37 respectively therefore represents a measure for the treatment of imbalance of the component lying opposite that component which has been neglected during the first working procedure.

At the terminal 36 or 37 respectively a voltage presents itself if the determined amount of initial imbalance in the adjacent component K2 displaced by 120° is smaller than the residual amount of imbalance RK1 in the former component K1 after the removal of the maximum possible amount of material in K1. The positive voltage then arising at the terminal 36 or 37 respectively is a measure for the removal of material in the component K'1 which is displaced by 180° with respect to the adjacent component K2.

Many changes and modifications in the above described embodiment of the invention can be carried out without departing from the scope thereof. Accordingly, that scope is intended to be limited only by the scope of the appended claims.

What is claimed is:

1. In a method of eliminating imbalances in rotors, with which a compensation of masses by removing material is carried out in components displaced by 120°, and with which further material is subsequently removed in components displaced by 60° with respect to the former components, in case only limited material is available for removal, the improvement wherein, if the amount of initial imbalance in a first component exceeds the amount of material available for removal in this component, the removal of the maximum possible amount of material is effected leaving a residual amount still to be eliminated in this component, and material is removed in a second adjacent component displaced by 120° until in this component, too, an amount of imbalance has been obtained equal to said residual amount, and that the imbalance resulting from these two residual amounts is eliminated by removing material in a third component displaced by 60° with respect to both said first and second components.

2. In a method of eliminating imbalances in rotors, with which a compensation of masses by removing material is carried out in components displaced by 120°, and with which further material is subsequently removed in components displaced by 60° with respect to the former components, in case only limited material is available for removal, the improvement wherein, if the amount of initial imbalance is a first component exceeds the amount of material available for removal in this component, the removal of the maximum possible amount of material is effected leaving a residual amount still to be eliminated in this component, and if the amount of initial imbalance determined in a second adjacent component displaced by 120° is smaller than the residual amount left in the former component, an amount of material corresponding to this differential amount is removed in a component displaced by 180° with respect to the adjacent component, and an amount of material corresponding to the residual amount left in the former component is removed in a component lying on an angle bisector between the former and the adjacent component so that the residual imbalance left after the first removal of material is eliminated.

3. An electrical circuit for determining the amounts of initial imbalance of a workpiece in two components displaced by 120° with respect to each other and determining the residual amounts which remain, after initial removal of material, in further components displaced by 60° with respect to said two components comprising:

a component calculator for receiving electrical imbalance signals and providing first and second component output signals in components displaced 120° with respect to each other, means for providing a reference signal indicating the maximum amount of removable material in one component, a first comparator circuit for receiving said reference signal and said first output signal and for providing a difference signal representing the difference between said reference signal and said first output signal when said first output signal exceeds said reference signal, a second comparator circuit for receiving said receiving said reference signal and said second output signal and for providing a difference signal representing the difference between said reference signal and said second output signal when said second output signal exceeds said reference signal, a first subtraction circuit for receiving said difference signal from said first comparator circuit and subtracting that difference signal from said second output signal to produce a signal indicating the material to be removed in one component, and a second subtraction circuit for receiving said difference signal from said second comparator circuit and subtracting that difference signal from said first output signal to produce a signal indicating the amount of material to be removed in the second component.

4. A circuit as in claim 3 wherein each of said comparator circuits includes an output terminal for providing said difference signal.

5. A circuit as in claim 3 wherein each comparator circuit includes a pair of further output terminals each connected, via a diode conducting current in an opposite direction from the other diode of that pair, to receive said difference signal.

6. A circuit as in claim 5 wherein each comparator circuit includes a bridging circuit connected to said diodes for providing an output of one of said further terminals so long as said first and second output signal are less than said reference signal.

* * * * *